(12) United States Patent
Liu et al.

(10) Patent No.: US 11,761,853 B2
(45) Date of Patent: Sep. 19, 2023

(54) ENGINE PISTON AND FATIGUE TESTING APPARATUS FOR ENGINE PISTON

(71) Applicants: WEICHAI POWER CO., LTD., Shandong (CN); WEICHAI HEAVY MACHINERY CO., LTD., Shandong (CN)

(72) Inventors: Haijun Liu, Shandong (CN); Ninglu Wang, Shangdong (CN); Fei Ma, Shandong (CN); Baoyu Liu, Shandong (CN); Lei Li, Shandong (CN)

(73) Assignees: Weichai Power Co., LTD., Weifang (CN); Weichai Heavy Machinery Co., LTD, Weifang (CN)

( * ) Notice: Subject to any disclaimer, the term of this patent is extended or adjusted under 35 U.S.C. 154(b) by 0 days.

(21) Appl. No.: 17/858,816

(22) Filed: Jul. 6, 2022

(65) Prior Publication Data

US 2023/0168153 A1 Jun. 1, 2023

(30) Foreign Application Priority Data

Nov. 30, 2021 (CN) .......................... 202111444919.6

(51) Int. Cl.
*G01M 15/02* (2006.01)
*G01M 15/09* (2006.01)

(52) U.S. Cl.
CPC ............ *G01M 15/09* (2013.01); *G01M 15/02* (2013.01)

(58) Field of Classification Search
CPC .............................. G01M 15/02; G01M 15/09

(Continued)

(56) References Cited

U.S. PATENT DOCUMENTS 3,759,148 A * 9/1973 Geffroy ...................... F16J 9/20
277/467
5,417,109 A * 5/1995 Scourtes ............. G01M 15/042
73/114.16

(Continued)

FOREIGN PATENT DOCUMENTS

CN 203561508 U 4/2014
CN 105841890 A 8/2016

(Continued)

OTHER PUBLICATIONS

China National Intellectual Property Administration, Office Action, CN Patent Application No. 202111444919.6, dated Jul. 7, 2023, 16 pages.

(Continued)

*Primary Examiner* — Eric S. McCall
(74) *Attorney, Agent, or Firm* — Fenwick & West LLP

(57) ABSTRACT

An engine piston is provided. A first sealing structure, including a first sealing rubber ring and a first annular groove, is provided at a head of the engine piston. The first sealing rubber ring has a U-shaped section with a reserved space at the top of the first sealing rubber ring, and a gap for circulating hydraulic oil is provided between a ring bank, above the first sealing rubber ring, of the engine piston and a simulated cylinder liner of a fatigue testing apparatus for an engine piston. In a case that the hydraulic oil is introduced into the fatigue testing apparatus for the engine piston to simulate pressure loading under a high-explosion pressure, when the hydraulic oil enters into the reserved space from the gap for circulating the hydraulic oil, an inner wall of the reserved space is squeezed and the first sealing rubber ring is deformed.

10 Claims, 6 Drawing Sheets

(58) Field of Classification Search
USPC .................................................... 73/114.01
See application file for complete search history.

(56) References Cited

U.S. PATENT DOCUMENTS

| | | | | |
|---|---|---|---|---|
| 5,633,459 | A * | 5/1997 | Rodriguez | G01M 13/005 73/49.7 |
| 5,814,724 | A * | 9/1998 | Romkee | G01M 15/06 73/114.25 |
| 2006/0081126 | A1 * | 4/2006 | Yamada | F16J 9/062 92/248 |
| 2008/0202203 | A1 * | 8/2008 | Cummings | G01M 99/007 73/9 |
| 2009/0241642 | A1 * | 10/2009 | Kyllingstad | G01M 3/025 73/40 |
| 2010/0326176 | A1 * | 12/2010 | Koivunen | F02M 65/00 73/114.41 |
| 2018/0283989 | A1 * | 10/2018 | Quarteng-Mensah | F01L 13/06 |
| 2021/0055181 | A1 * | 2/2021 | Meng | G01M 99/007 |
| 2021/0140843 | A1 * | 5/2021 | Rodríguez-Casiano | G01M 3/26 |
| 2021/0325297 | A1 * | 10/2021 | Guo | G01M 13/005 |

FOREIGN PATENT DOCUMENTS

| | | |
|---|---|---|
| CN | 205653110 U | 10/2016 |
| CN | 109612701 A | 4/2019 |
| GB | 939189 A | 10/1963 |

OTHER PUBLICATIONS

Zhen-Tao, L et al., "Development of engine connecting rod tension and compression fatigue simulation test rig," Journal of Mechanical & Electrical Engineering, vol. 28, No. 6, Jun. 2011, pp. 653-662.

* cited by examiner

ENGINE PISTON AND FATIGUE TESTING APPARATUS FOR ENGINE PISTON

CROSS REFERENCE TO RELATED APPLICATIONS

This application claims priority to Chinese patent application No. 202111444919.6, titled "ENGINE PISTON AND FATIGUE TESTING APPARATUS FOR ENGINE PISTON", filed with the China National Intellectual Property Administration Nov. 30, 2021, which is incorporated by reference in its entirety.

FIELD

The present application relates to the technical field of engine pistons, and in particular relates to an engine piston and a fatigue testing apparatus for an engine piston.

BACKGROUND

Pressure is directly applied in a cylinder in the present technical solutions, high-pressure oil directly enters a hydraulic space above a piston through a joint of an oil pipe, and hydraulic pressure on the top of the piston is monitored. The hydraulic pressure is provided by a pump station or a group of pump stations. In a testing apparatus, the top of the piston is directly load-applied with high-pressure hydraulic oil and is monitored by a pressure sensor. A special O-shaped seal ring and a special shape rubber ring are used to seal the periphery of the circumference of the piston, and a bottom of the piston is communicated to another path of hydraulic oil, which mainly applies an inertia force to the bottom of the piston.

The conventional fatigue testing apparatus for an engine piston cannot simulate pressure loading under high-explosion pressure. Under high pressure, the O-shaped seal ring and the special shape rubber ring are deformed, and the performance of pressure resistance is poor. With the increase of explosion pressure and rotational speed after the engine is strengthened, the load on the piston increases, and the fatigue strength performance of the piston is particularly important. The requirements of the fatigue strength cannot be met in the conventional scheme, acceleration assessment cannot be carried out, and the ultimate fatigue strength of the piston cannot be evaluated.

Therefore, how to overcome the above-mentioned technical defects is an urgent problem to be solved by those skilled in the art.

SUMMARY

The purpose of the present application is to provide an engine piston and a fatigue testing apparatus for an engine piston, which can effectively evaluate the fatigue life of the piston.

In order to solve the above technical problems, an engine piston is provided according to the present application. A first sealing structure is provided at a head of the engine piston, and the first sealing structure includes a first annular groove and a first sealing rubber ring arranged in the first annular groove, the first sealing rubber ring has a U-shaped section with a reserved space at the top of the first sealing rubber ring, when hydraulic oil is introduced into a fatigue testing apparatus for an engine piston, the hydraulic oil enters into the reserved space of the first sealing rubber ring from a gap between a ring bank, above the first sealing rubber ring, of the engine piston and a simulated cylinder liner of the fatigue testing apparatus for the engine piston, an inner wall of the reserved space is squeezed, so that the first sealing rubber ring is deform radially to form a radial seal.

Optionally, a second sealing structure is provided at the head of the engine piston, and the second sealing structure includes a second annular groove arranged below the first annular groove and a retaining ring arranged in the second annular groove.

Optionally, the first annular groove and the second annular groove are communicated with each other.

Optionally, the retaining ring is a rubber ring, a Glyd ring or a steel piston ring.

Optionally, the steel piston ring is composed of two semicircles.

Optionally, the reserved space is of an inverted trapezoid shape.

Optionally, multiple ring banks are provided at the engine piston in an axial direction.

A fatigue testing apparatus for an engine piston is further provided according to the present application. The fatigue testing apparatus includes a base, a simulated connecting rod, a simulated cylinder liner, a support body, an upper cover plate, a screw plug, a pressure detection device and the engine piston according to any one of the above described items, the upper cover plate and the base are provided at two ends of the simulated cylinder liner respectively, and the support body is mounted at an outer side of the simulated cylinder liner, the engine piston is arranged in a cavity defined by the simulated cylinder liner, the head of the engine piston abuts with the upper cover plate, and a bottom of the engine piston is connected to the base through the simulated connecting rod, a low-pressure oil circuit for introducing the hydraulic oil into the bottom of the engine piston is provided at the base for loading an inertial force, and an outlet of the low-pressure oil circuit is plugged by the screw plug, and the pressure detection device for detecting a pressure of the hydraulic oil is provided at the upper cover plate.

Optionally, an oil discharging channel for communicating a gap between the upper cover plate and the support body with the outlet of the low-pressure oil circuit is provided at the support body.

Optionally, a first tooling sealing rubber ring is provided between the upper cover plate and the support body, and/or, a second tooling sealing rubber ring is provided between the simulated cylinder liner and the upper cover plate.

The engine piston according to the present application has the following advantageous effects: in a case that the hydraulic oil is introduced into the fatigue testing apparatus for the engine piston to simulate pressure loading under a high-explosion pressure, when the hydraulic oil enters into the reserved space of the first sealing rubber ring from the gap for circulating the hydraulic oil, an inner wall of the reserved space is squeezed, which enables the first sealing rubber ring to be in a closer fit with the simulated cylinder liner, the gap between the first sealing rubber ring and the simulated cylinder liner gradually decreases and disappears to form an effective radial seal, thereby preventing the leakage of the hydraulic oil from the gap, which can quickly improve a test efficiency, and can quickly and effectively evaluate the fatigue life of the piston.

The fatigue testing apparatus for the engine piston according to the present application has the above engine piston, and thus also has the above advantageous effects, which will not be repeated here.

BRIEF DESCRIPTION OF THE DRAWINGS

For more clearly illustrating embodiments of the present application or technical solutions in the conventional technology, the drawings referred to for describing the embodiments or the conventional technology will be briefly described hereinafter. Apparently, the drawings in the following description are only some examples of the present application, and for those skilled in the art, other drawings may be obtained based on the provided drawings without any creative efforts.

Figure 1:
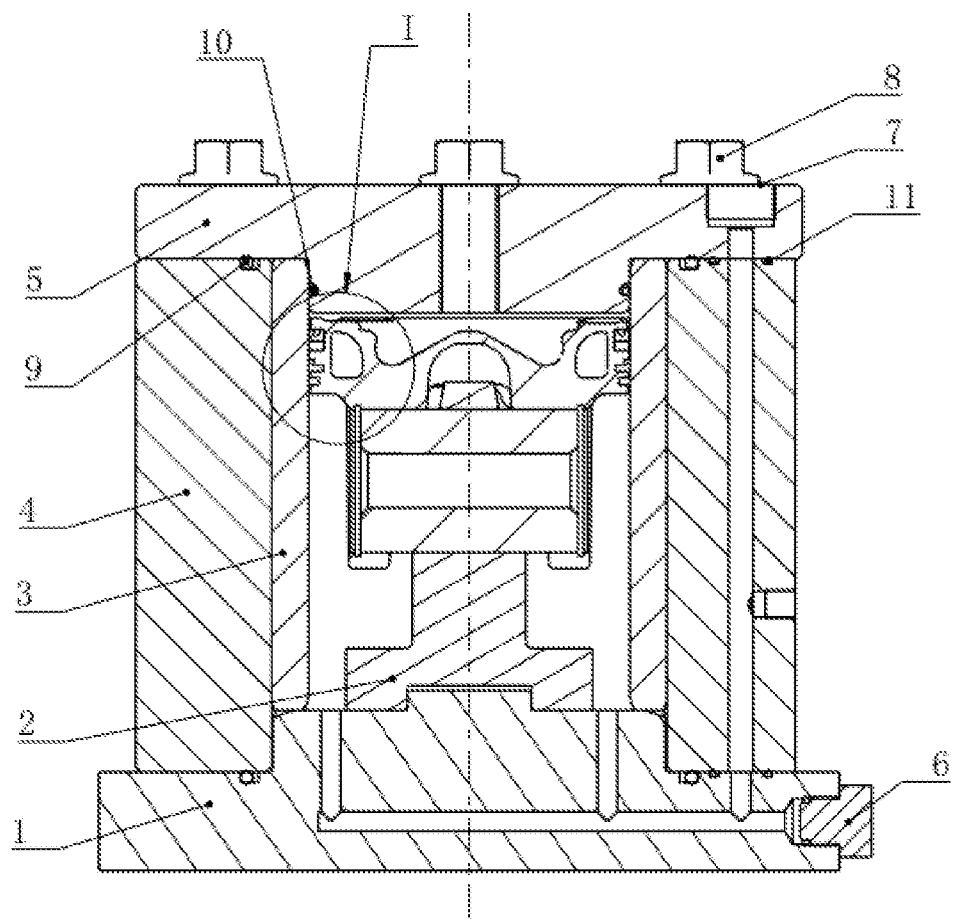
FIG. 1 is a schematic diagram of the structure of a fatigue testing apparatus for an engine piston according to one embodiment of the present application.

In the Figures above, reference numerals are as follows:
1-base; 2-simulated connecting rod; 3-simulated cylinder liner; 4-support body; 5-upper cover plate; 6-screw plug; 7-pressure detection device; 8-clamping bolt; 9-first tooling sealing rubber ring; 10-second tooling sealing rubber ring; 11-third tooling sealing rubber ring; 12-first sealing rubber ring; 13-retaining ring.

DETAILED DESCRIPTION

The embodiments of the present application are described in detail hereinafter, and examples of the embodiments are shows in drawings, in which the same or similar reference numerals represent the same or similar members or members having the same or similar functions throughout the description. The embodiments described below with reference to the drawings are only exemplary embodiments which are used to explain the present application, and should not be construed to limit the present application.

In the description of the present application, it should be understood that regarding the orientation description, the orientation or positional relationships indicated by terms "up", "down", "front", "back", "left", "right" and the like are based on the orientation or positional relationships shown in the drawings, and are merely for the convenience of describing the present application and the simplification of the description, and do not indicate or imply that the device or element referred to must be in a particular orientation, or be constructed and operated in a particular orientation, and therefore should not be construed as a limit to the scope of the present application.

In the description of the present application, "multiple" means two or more. If there is a description of "first" and "second", it is only for the purpose of distinguishing technical features, and should not be understood as indicating or implying relative importance or implicitly indicating that the number of technical features indicated or implicitly indicates the order of the indicated technical features.

In the description of the present application, unless otherwise clearly defined, words such as setting, installation, connection should be understood in a broad sense, and those skilled in the art can reasonably determine the specific meanings of the above words in the present application in combination with the specific content of the technical solution.

The core of the present application is to provide an engine piston and a fatigue testing apparatus for an engine piston, which can effectively evaluate the fatigue life of the piston.

In order to make those skilled in the art better understand the technical solutions according to the present application, the present application will be further described in detail below with reference to the accompanying drawings and specific embodiments.

Figure 2:
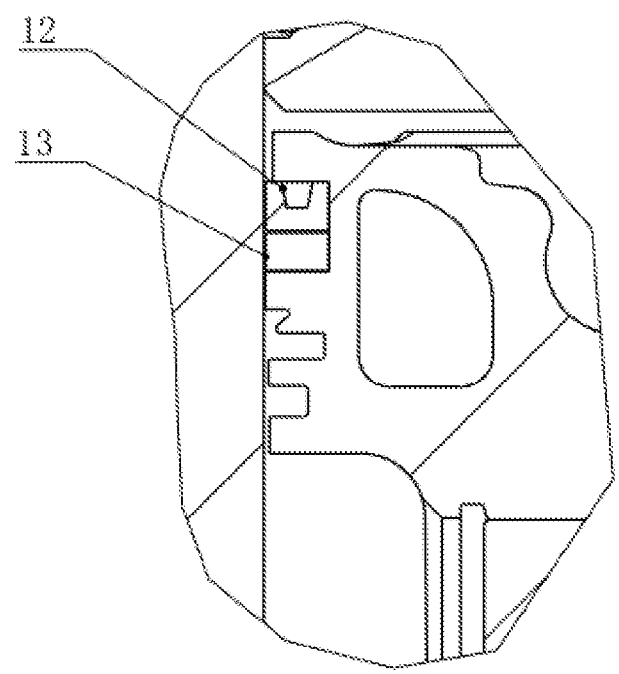
FIG. 2 is a partially enlarged view of FIG. 1 at a position of I according to one embodiment of the present application.
Figure 3:
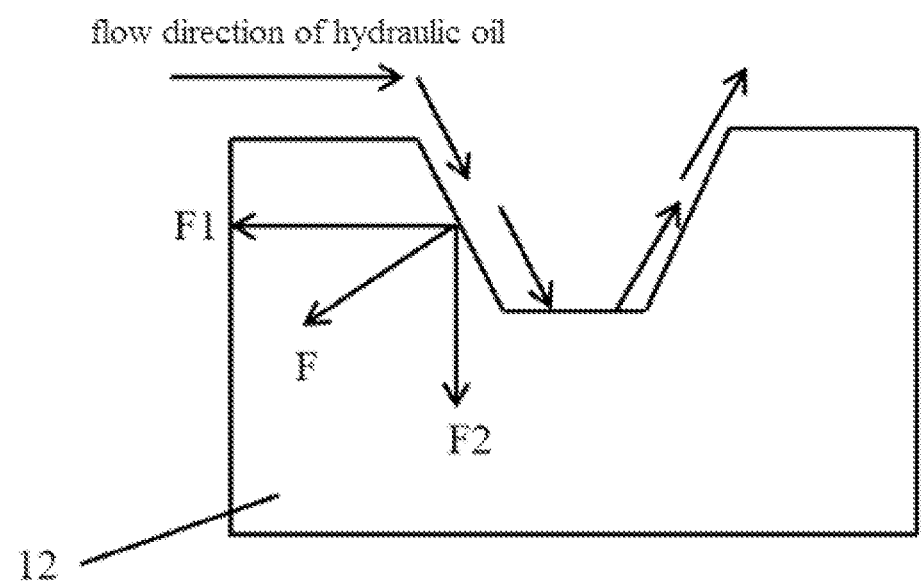
FIG. 3 is a schematic diagram of force bearing of a first ring bank according to one embodiment of the present application.
Figure 4:
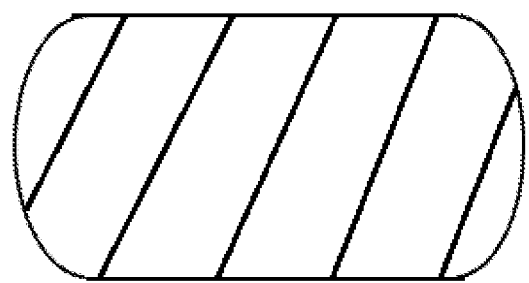
FIG. 4 is a cross-sectional view of a retaining ring which is a rubber ring with a rectangular cross-section according to one embodiment of the present application.
Figure 5:
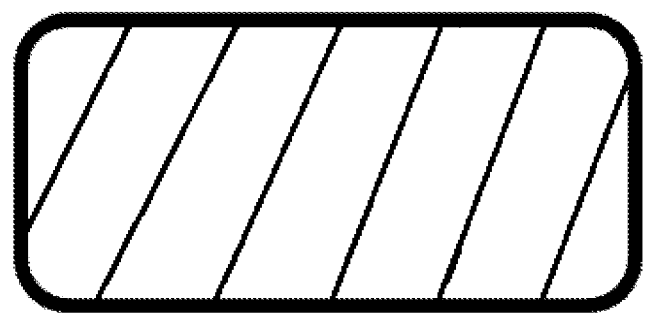
FIG. 5 is a cross-sectional view of a retaining ring which is a Glyd ring or a steel piston ring with a rectangular cross-section according to one embodiment of the present application.
Figure 6:
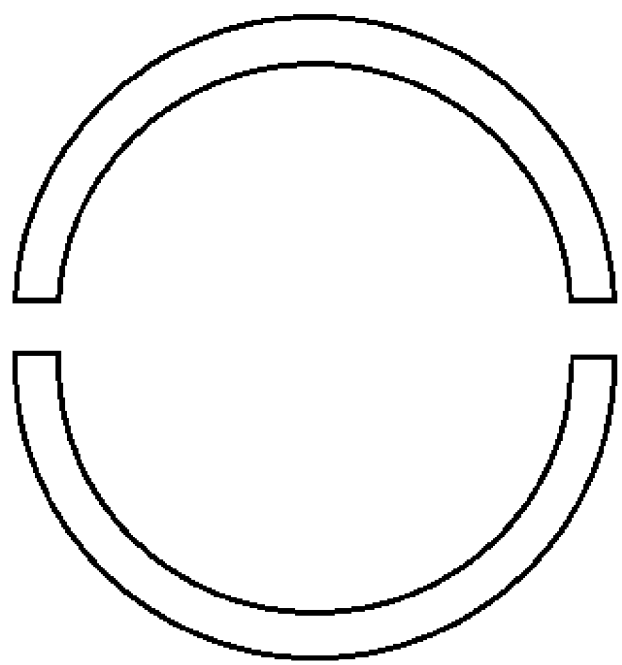
FIG. 6 is a schematic diagram of the structure of a retaining ring which is a steel piston ring according to one embodiment of the present application.

Specifically, reference is made to FIGS. 1 to 6, FIG. 1 is a schematic diagram of the structure of an fatigue testing apparatus for an engine piston according to one embodiment of the present application; FIG. 2 is a partially enlarged view of FIG. 1 at a position of I according to one embodiment of the present application; FIG. 3 is a schematic diagram of force bearing of a first ring bank according to one embodiment of the present application; FIG. 4 is a cross-sectional view of a retaining ring which is a rubber ring with a rectangular cross-section according to one embodiment of the present application; FIG. 5 is a cross-sectional view of a retaining ring which is a Glyd ring or a steel piston ring according to one embodiment of the present application; and FIG. 6 is a schematic diagram of the structure of a retaining ring which is a steel piston ring according to one embodiment of the present application.

An engine piston is provided according to the present application. A first sealing structure is provided at a head of the engine piston. The first sealing structure includes a first annular groove and a first sealing rubber ring 12 arranged in the first annular groove.

The first sealing rubber ring 12 has a U-shaped section with a reserved space at the top of the first sealing rubber ring.

When hydraulic oil is introduced into a fatigue testing apparatus for an engine piston to simulate pressure loading under a high-explosion pressure, the hydraulic oil enters into the reserved space of the first sealing rubber ring 12 from a gap between a ring bank, above the first sealing rubber ring 12, of the engine piston and a simulated cylinder liner 3 of the fatigue testing apparatus for the engine piston, an inner wall of the reserved space is squeezed, so that the first sealing rubber ring 12 is deformed, which enables the first sealing rubber ring to be in a closer fit with the simulated cylinder liner, the gap between the first sealing rubber ring and the simulated cylinder liner gradually decreases and disappears to form an effective radial seal, thereby preventing the leakage of the hydraulic oil from the gap.

It should be noted that, as shown in FIG. 3, when the hydraulic oil at the top enters into and fills the reserved space of the first sealing rubber ring 12, the hydraulic oil generates a pressure F on a side of the reserved space, and the pressure F can be decomposed into two forces in the horizontal and vertical directions, one force F1 of which is applied on a side of the first sealing rubber ring 12, exerting a force on the simulated cylinder liner 3 to form radial sealing (both static sealing and dynamic sealing). During the fatigue test of the piston, the reliable radial seal is enabled to ensure the pressure, to prevent the leakage of the hydraulic oil from the gap (if the amount of the leakage is large, test loads and test frequencies or the like will be affected, which will inevitably increase the evaluation time). The other force component F2 acts vertically downward, exerting a force on an end face of the annular groove of the piston.

In the engine piston according to the present application, test efficiency can be quickly improved, and the fatigue life of the piston can be evaluated quickly and effectively.

In order to make the piston have better air tightness, a second sealing structure is provided at the head of the engine piston, and the second sealing structure includes a second annular groove arranged below the first annular groove and a retaining ring 13 arranged in the first annular groove. The retaining ring 13 is pressed between the second annular groove and the simulated cylinder liner 3, so as to overcome the movement of the piston in the annular groove, thereby reducing the amount of air leakage.

The retaining ring 13 is a rubber ring, a Glyd ring, or a steel piston ring in one embodiment.

A force is exerted on the end face of the annular groove of the piston due to the other force component F2. In order to prevent the first sealing rubber ring 12 from being deformed by force under a high-explosion pressure, resulting in the risk of oil leakage caused by slight movement of the first sealing rubber ring 12 in the piston. In addition, different retaining rings are provided under the first sealing rubber ring 12 and mainly act to support the first seal rubber ring 12, and prevent the risk of oil leakage due to large deformation under the force.

In particular, the first annular groove and the second annular groove are communicated with each other, and can be regarded as an integrated through groove.

Each of the cross-sections of the rubber ring, the Glyd ring or the steel piston ring is of a rectangular shape, as shown in FIGS. 4 and 5, and a rounded transition can also be provided. The overall shape of the rubber ring, the Glyd ring or the steel piston ring is of a circular-shape. The Glyd ring has a strength higher than that of the rubber ring and has a similar shape as that of the rubber ring.

As shown in FIG. 6, the steel piston ring is composed of two semicircles. The steel piston ring is machined and cut from the center with an inner chamfer of the ring being kept. When being installed, the steel piston ring is placed into the second annular groove of the piston.

In a specific embodiment, the reserved space of the first sealing rubber ring 12 is of an inverted trapezoid shape, and a side surface of the inverted trapezoid shape has an inclined angle.

The sealing is enabled by a combination of the first sealing rubber ring 12 and the retaining ring 13, for example, the combination of sealing as shown in FIG. 2, different first sealing rubber rings 12 (the inclination angle of a side of the inner wall of the reserved space of the first sealing rubber ring 12 is different, and the pressure resistance of a side of the cylinder liner is different) and different retaining rings 13 (under different explosion pressures, different support methods are selected, and the rubber ring, Gray ring, and steel piston ring with a rectangular section can be used in turn) are utilized according to different explosion pressures.

According to the present combination of sealing, high simulated high explosion pressure can be withstood. According to the different explosion pressures of the engine, a corresponding combination of sealing is selected. The implementation of the above method is very effective in evaluating the reliability of the fatigue of the piston under the maximum explosion pressure.

Of course, multiple ring banks may be provided at the engine piston along an axial direction, and the number and specific structure of the ring banks can be adaptively selected according to actual needs, which is not further limited here.

The engine piston according to the present application has the following advantageous effects: 1) different combinations of sealing is utilized to apply simulated loads of explosion pressure, which can quickly increase high pressure and high acceleration coefficient for evaluating the fatigue; 2) the present application designs a fatigue testing method for the piston, a device and a system that can quickly apply the maximum explosion pressure, and the present design method can quickly and effectively perform simulated loading; 3) different U-shaped rubber rings and different retaining rings are utilized to simulate different explosion pressures; and 4) the design has a simple structure, is fast and effective, and can effectively evaluate the fatigue life of the piston.

In addition, a fatigue testing apparatus for an engine piston is provided according to the embodiment. The fatigue testing apparatus includes a base 1, a simulated connecting rod 2, a simulated cylinder liner 3, a support body 4, an upper cover plate 5, a screw plug 6, a pressure detection device 7 and the above engine piston.

The upper cover plate 5 and the base 1 are provided at two ends of the simulated cylinder liner 3 respectively, and the support body 4 is mounted at an outer side of the simulated cylinder liner 3. The engine piston is arranged in a cavity defined by the simulated cylinder liner 3, the head of the engine piston abuts with the upper cover plate 5, and a bottom of the engine piston is connected to the base 1 through the simulated connecting rod 2.

A low-pressure oil circuit for introducing the hydraulic oil into the bottom of the engine piston is provided at the base 1 for loading an inertial force, and an outlet of the low-pressure oil circuit is plugged by the screw plug 6. The pressure detection device 7 for detecting a pressure of the hydraulic oil is provided at the upper cover plate 5.

Since the fatigue testing apparatus for the engine piston has the above-mentioned engine piston, the fatigue testing apparatus for an engine piston has the advantageous effects brought by the engine piston, and reference can be made to the above description, which will not be repeated here.

An oil discharging channel for communicating a gap between the upper cover plate 5 and the support body 4 with the outlet of the low-pressure oil circuit is provided at the support body 4.

In order to improve the performance of the tooling sealing, a first tooling sealing rubber ring 9 and a third tooling sealing rubber ring 11 are provided between the upper cover plate 5 and the support body 4, and/or, a second tooling sealing rubber ring 10 is provided between the simulated cylinder liner 3 and the upper cover plate 5.

The above embodiments are described in a progressive manner. Each of the embodiments is mainly focused on describing its differences from other embodiments, and for the same or similar parts of the embodiments, one may refer to the description of other embodiments.

The principle and the embodiments of the present disclosure are illustrated herein by specific examples. The above description of examples is only intended to facilitate the understanding of the method and core idea of the present disclosure. It should be noted that, for those skilled in the art, many modifications and improvements may be made to the present disclosure without departing from the principle of the present disclosure, and these modifications and improvements are also deemed to fall into the protection scope defined by the claims of the present disclosure.

What is claimed is:

1. An engine piston comprising:
a first sealing structure at a head of the engine piston, and the first sealing structure comprises a first annular groove and a first sealing rubber ring arranged in the first annular groove,
the first sealing rubber ring has a U-shaped section with a reserved space at a top of the first sealing rubber ring,
when hydraulic oil is introduced into a fatigue testing apparatus for the engine piston, the hydraulic oil enters into the reserved space of the first sealing rubber ring from a gap between a ring bank, above the first sealing rubber ring, of the engine piston and a simulated cylinder liner of the fatigue testing apparatus for the engine piston, an inner wall of the reserved space is squeezed, such that the first sealing rubber ring is deformed to form a radial seal.

2. The engine piston according to claim 1, wherein a second sealing structure is provided at the head of the engine piston, and the second sealing structure comprises a second annular groove arranged below the first annular groove and a retaining ring arranged in the second annular groove.

3. The engine piston according to claim 2, wherein the first annular groove and the second annular groove are communicated with each other.

4. The engine piston according to claim 2, wherein the retaining ring is a rubber ring, a Glyd ring or a steel piston ring.

5. The engine piston according to claim 4, wherein the steel piston ring comprises two semicircles.

6. The engine piston according to claim 1, wherein the reserved space comprises an inverted trapezoid shape.

7. The engine piston according to claim 1, wherein a plurality of ring banks is provided at the engine piston in an axial direction.

8. A fatigue testing apparatus for an engine piston, comprising:
a base, a simulated connecting rod, a simulated cylinder liner, a support body, an upper cover plate, a screw plug, a pressure detection device, and the engine piston according to claim 1, wherein
the upper cover plate and the base are provided at two ends of the simulated cylinder liner respectively, and the support body is sleeved at an outer side of the simulated cylinder liner,
the engine piston is arranged in a cavity defined by the simulated cylinder liner, the head of the engine piston abuts with the upper cover plate, and a bottom of the engine piston is connected to the base through the simulated connecting rod,
a low-pressure oil circuit for introducing the hydraulic oil into the bottom of the engine piston is provided at the base for loading an inertial force, and an outlet of the low-pressure oil circuit is plugged by the screw plug, and
the pressure detection device for detecting a pressure of the hydraulic oil is provided at the upper cover plate.

9. The fatigue testing apparatus for an engine piston according to claim 8, wherein an oil discharging channel for communicating a gap between the upper cover plate and the support body with the outlet of the low-pressure oil circuit is provided at the support body.

10. The fatigue testing apparatus for an engine piston according to claim 8, wherein at least one of a first tooling sealing rubber ring is provided between the upper cover plate and the support body,
and, a second tooling sealing rubber ring is provided between the simulated cylinder liner and the upper cover plate.

* * * * *